United States Patent
Harper (10) Patent No.: US 8,347,829 B2
(45) Date of Patent: Jan. 8, 2013

(54) ELECTROLYTIC REACTOR AND RELATED METHODS FOR SUPPLEMENTING THE AIR INTAKE OF AN INTERNAL COMBUSTION ENGINE

(76) Inventor: James Harper, San Diego, CA (US)

( * ) Notice: Subject to any disclaimer, the term of this patent is extended or adjusted under 35 U.S.C. 154(b) by 419 days.

(21) Appl. No.: 12/476,385

(22) Filed: Jun. 2, 2009

(65) Prior Publication Data

US 2010/0300381 A1    Dec. 2, 2010

(51) Int. Cl.
*F02B 43/08* (2006.01)
(52) U.S. Cl. ............................................ 123/3; 205/412
(58) Field of Classification Search ................... 123/1 A, 123/DIG. 12, DIG. 13
See application file for complete search history.

(56) References Cited

U.S. PATENT DOCUMENTS

| | | | |
|---|---|---|---|
| 138,018 A | 5/1921 | Boisen | |
| 876,879 A | 9/1932 | Drabold | |
| 2,509,498 A | 5/1950 | Heyl | |
| 3,311,097 A | 3/1967 | Mittelstaedt | |
| 3,939,806 A | 2/1976 | Bradley | |
| 3,980,053 A | 9/1976 | Horvath | |
| 4,023,545 A | 5/1977 | Mosher et al. | |
| 4,031,865 A | 6/1977 | Dufour | |
| 4,085,709 A | 4/1978 | Tangri | |
| 4,111,160 A | 9/1978 | Talenti | |
| 4,271,793 A | 6/1981 | Valdespino | |
| 4,368,696 A | 1/1983 | Reinhardt | |
| 4,382,189 A | 5/1983 | Wilson | |
| 4,442,801 A | 4/1984 | Glynn et al. | |
| 4,573,435 A * | 3/1986 | Shelton | 123/3 |
| 4,754,726 A | 7/1988 | Eller | |
| 4,761,349 A * | 8/1988 | McPheeters et al. | 429/456 |
| 4,773,981 A | 9/1988 | Bidwell | |
| 5,105,773 A | 4/1992 | Cunningham et al. | |
| 5,231,954 A | 8/1993 | Stowe | |
| 5,293,857 A | 3/1994 | Meyer | |
| 5,305,715 A | 4/1994 | Nissley | |
| 5,450,822 A | 9/1995 | Cunningham | |
| 5,452,688 A | 9/1995 | Rose | |
| 5,458,095 A | 10/1995 | Post et al. | |
| 5,632,870 A | 5/1997 | Kucherov | |
| 6,057,052 A * | 5/2000 | Shrim et al. | 429/406 |
| 6,071,636 A * | 6/2000 | Mosdale | 429/413 |
| 6,117,288 A * | 9/2000 | Adler et al. | 204/256 |
| 6,155,212 A | 12/2000 | McAlister | |
| 6,209,493 B1 | 4/2001 | Ross | |
| 6,336,430 B2 | 1/2002 | de Souza et al. | |
| 6,408,966 B1 * | 6/2002 | Benz et al. | 180/65.1 |

(Continued)

OTHER PUBLICATIONS

Sid Young, Efficiency simplified vhs, online video post, Jun. 23, 2009, youtube.com, http://www.youtube.com/watch?v=Biyteu9oUhk (last visited Jul. 10, 2009).

*Primary Examiner* — Noah Kamen
*Assistant Examiner* — Long T Tran
(74) *Attorney, Agent, or Firm* — John K. Buche; Buche & Associates, P.C.

(57) ABSTRACT

An electrolytic reactor and related methods are provided for supplementing the air-intake of an internal combustion engine with hydrogen. In one embodiment, the reactor has a core defined by a plurality of whole metal plates separated by peripheral gaskets; an inlet for providing an electrolyte to the core; a gas and effluent outlet, and a pump to force an electrolyte through the core.

23 Claims, 4 Drawing Sheets

U.S. PATENT DOCUMENTS

| | | |
|---|---|---|
| 6,613,467 B1 * | 9/2003 | Chizawa et al. ............... 429/413 |
| 6,668,616 B1 * | 12/2003 | Shoji et al. ..................... 73/23.2 |
| 7,021,249 B1 | 4/2006 | Christison |
| 7,143,722 B2 | 12/2006 | Ross |
| 7,191,737 B2 | 3/2007 | Klein |
| 7,240,641 B2 | 7/2007 | Balan et al. |
| 7,258,779 B2 | 8/2007 | Casey et al. |
| 7,401,578 B2 | 7/2008 | Otterstrom et al. |
| 7,412,947 B2 | 8/2008 | Shinagawa et al. |
| 7,430,991 B2 | 10/2008 | VanHoose et al. |
| 7,458,368 B1 | 12/2008 | Huffman |
| 2004/0040838 A1 * | 3/2004 | Helmke et al. ............. 204/275.1 |
| 2005/0136294 A1 * | 6/2005 | Tsunoda ......................... 429/12 |
| 2005/0178061 A1 * | 8/2005 | Tonca ............................... 48/61 |
| 2007/0243441 A1 * | 10/2007 | Tsunoda ......................... 429/27 |
| 2008/0047830 A1 * | 2/2008 | Fairfull et al. ................ 204/276 |

* cited by examiner

ELECTROLYTIC REACTOR AND RELATED METHODS FOR SUPPLEMENTING THE AIR INTAKE OF AN INTERNAL COMBUSTION ENGINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention is in the field of electrolytic reactors for supplementing the air-intake of an internal combustion engine.

2. Background of the Invention

Conventional electrolytic reactors have been used for supplementing the air-intake of internal combustion engines. Typically, the conventional electrolytic reactor comprises an electrolyte solution disposed between alternating anodic and cathodic metal plates. Passing an electric current flux through the electrolyte via the anodic and cathodic plates creates hydrogen gas. Conceptually, hydrogen produced by the conventional electrolytic reactor is mixed into the air-intake whereby the fuel-air mixture is more potent and burns more efficiently.

Although conceptually operable, there are many problems and inconveniences associated with the conventional electrolytic reactor for supplementing internal combustion engines. Typically, the conventional reactor operates at high amperage electric current thereby causing frequent overheating of the cell and excessive water consumption. Frequently, the anodic and cathodic plates are provided with apertures for the installation of structural supports or for collecting the hydrogen. However, placing holes in the metal plates reduces the amount of relative space available for producing hydrogen, creates additional resistance, overheating, and thereby reduces the efficiency of hydrogen production.

Additionally, the maintenance schedule of a conventional electrolytic reactor for supplementing an internal combustion engine has not typically been aligned with the maintenance schedule of the internal combustion engine and its component parts. In other words, supplementing an internal combustion engine with a conventional electrolytic reactor requires a separate maintenance schedule. For example, an oil change for the internal combustion engine may occur every other month whereas the electrolyte (typically water) refill or schedule might typically be weekly.

SUMMARY OF THE INVENTION

Accordingly, It is an object of the present invention to provide an electrolytic reactor for supplementing the air-intake of an internal combustion engine that operates at low amperage electric currents.

It is yet a further object of the present invention to provide an electrolytic reactor for supplementing the air-intake of an internal combustion engine that is less predisposed to overheat than the conventional cell.

It is yet a further object of the present invention to provide an electrolytic reactor for supplementing the air-intake of an internal combustion engine that does not require the alteration or modification of the metal plates.

Another object of the present invention is to provide an electrolytic reactor for supplementing the air-intake of an internal combustion engine that features a maintenance schedule comparable to that of the associated internal combustion engine and its components.

Another object of the present invention is to increase the gas-mileage of an automobile operating via an internal combustion engine.

BRIEF DESCRIPTION OF THE FIGURES

Other objectives of the invention will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

The present invention may suitably comprise two concepts: (1) an electrolytic reactor for producing hydrogen; and (2) a method for using the hydrogen produced via an electrolytic reactor to supplement the air-intake of an internal combustion engine. In general, the electrolytic reactor comprises whole anodic and cathodic metal plates (e.g., 304L or 316L stainless steel plates) concentrically spaced via a peripheral epoxy resin whereby an electrolyte provided between adjacent plates decomposes to hydrogen gas (among other products) which escapes through a duct in the epoxy resin. From the reactor, the hydrogen gas is introduced to the air-intake of an internal combustion engine, preferably without altering the permanent components of the engine.

Figure 1:
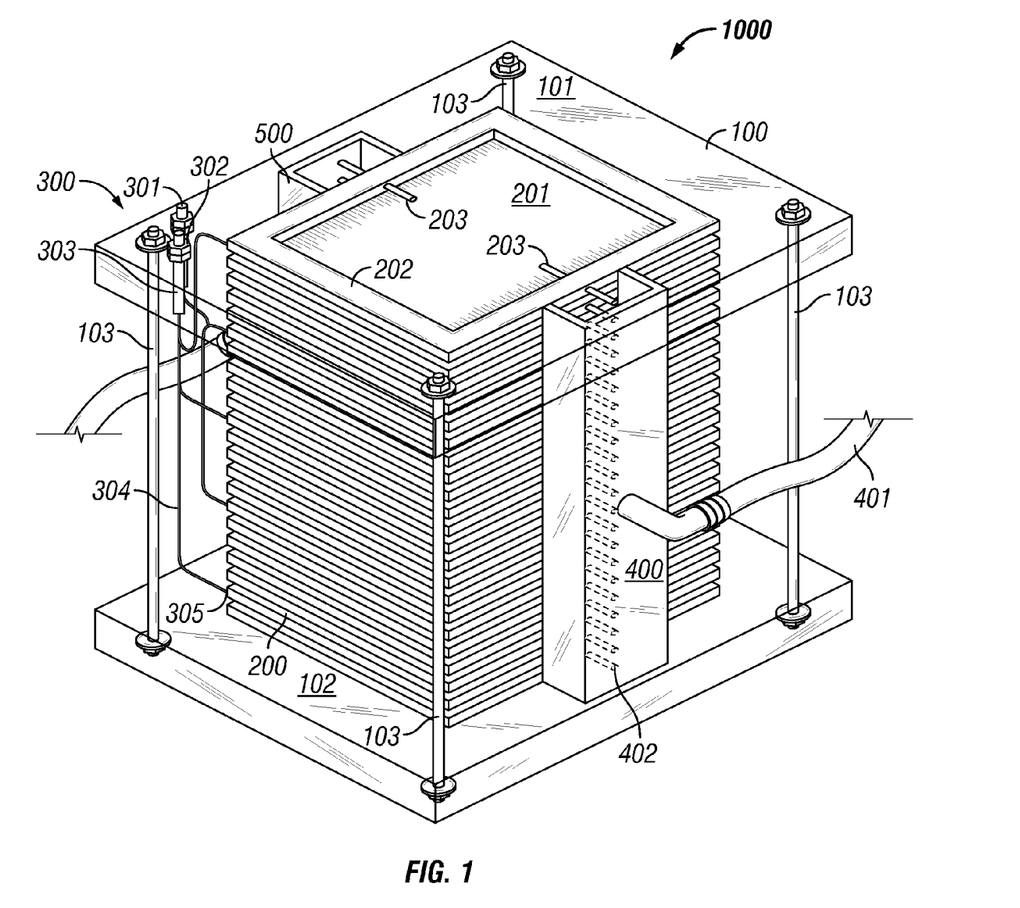
FIG. 1 is a three dimensional overview of an electrolytic reactor.

FIG. 1 is a perspective view of a preferable electrolytic reactor 1000. In general, the electrolytic reactor 1000 comprises five suitable subassemblies: (1) the casing 100; (2) the core 200; (3) the circuitry 300; (4) the electrolyte inlet 400; and, (5) the gas and effluent outlet 500. As seen in the figure, the inlet 400, the outlet 500, and the circuit 300 are integrally coupled to the core 200 within the casing 100.

Still referring to FIG. 1, the casing 100 may be thought of essentially as a vise comprising: (1) a first panel 101; a second panel 102; and, (3) at least one pressing means 103. In a preferable embodiment, the pressing means 103 is a screw-washer-nut system. However, the pressing means 103 could also be a winching, levering, adhesive, or screwing system as such are readily known to those skilled in the vise arts. As discussed below, the primary function of the casing 100 is to secure and press the core 200 between the first 101 and second 102 panels.

Yet still referring to FIG. 1, the core 200 comprises: (1) a plurality of approximately equally dimensioned whole metal plates 201; (2) a plurality of spacers 202; and, (3) a plurality of ducts 203. As seen in the figure, the metal plates 201 are typically aligned concentrically and separated by the spacers 202. As discussed in further detail below, cooperating ducts 203 are preferably provided to each spacer 202.

Figure 2A:
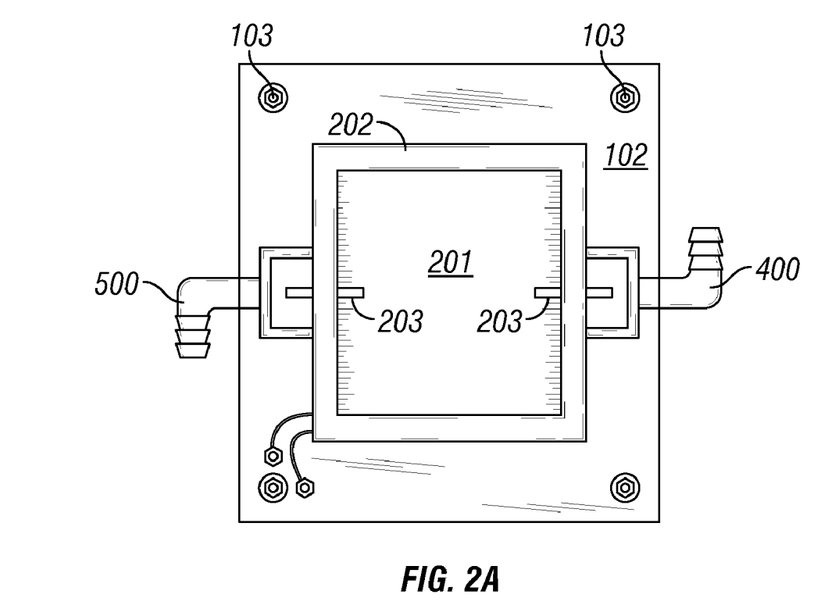
FIG. 2A is a cross-section of the electrolytic reactor of FIG. 1.
Figure 2B:
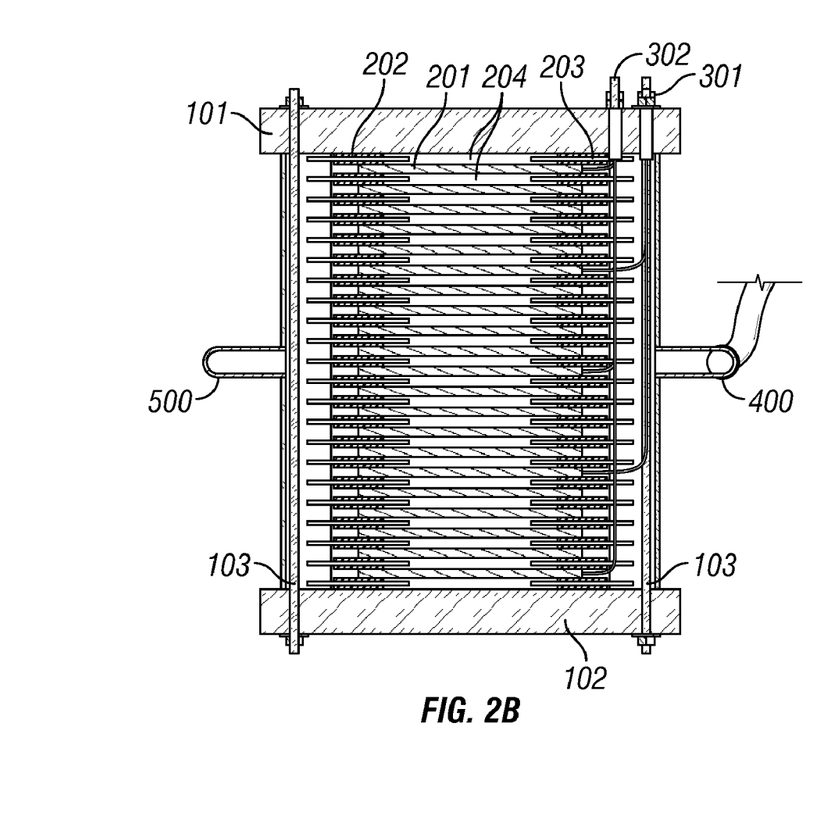
FIG. 2B is an alternate cross-section of the electrolytic reactor of FIG. 1.

FIG. 2A shows a cross-section of the core 200, parallel to the aligned metal plates 201. FIG. 2B shows a cross-section of the core 200, perpendicular to the aligned metal plates 201. As seen in FIGS. 2A and 2B, each spacer 203 peripherally spaces adjacent metal plates 201 whereby a pocket 204 is created therebetween. In a preferable embodiment, the spacers are composed by any material suitable for operation as a gasket (e.g. red rubber gasket or neoprene gasket) around the periphery of the whole metal plates. Consequently, the core 200 is preferably defined by a plurality of pockets 204 and, as discussed further below, electrolytic production of hydrogen preferably occurs within each pocket 204 during reactor 1000 operation.

Also seen in FIGS. 2A and 2B, cooperating ducts 203 are provided to the spacers 202, preferably on opposite sides of the pocket 204. As discussed in further detail below, the cooperating ducts 203 and pocket 204 system provides a channel between the inlet 400 and the outlet 500. Also discussed further below, an electrolyte is provided to at least one pocket 204 for electrolytic hydrogen production via a duct 203 on the inlet 400 side of the core 200 and the resultant gas plus effluent is removed from the pocket via the cooperating duct 203 on the outlet 500 side.

Referring again to FIG. 1, the circuitry 300 comprises: anodic 301 and cathodic 302 terminals; blade connectors 303; wiring 304; and preferably soldered connections 305. As seen in the figure, the anodic 301 and cathodic 302 terminals are preferably supported to the casing 100 whereby each terminal 301, 302 is accessible at two or more locations. Typically, a first location on each terminal 301, 302 is connected to the wiring 304 via a blade connector 303. Suitably, a second location on each terminal 301, 302 is accessible to an external electricity source.

Referring now to FIG. 2B, suitably, the wiring 300 from the cathodic terminal 302 and the wiring 300 from the anodic terminal 301 alternatingly couple to non-consecutive metal plates 201 within the core 200. For example, in a preferable embodiment of the reactor 1000 wherein the core 200 comprises twenty-one metal plates 201, the cathodic coupling preferably occurs at the first, eleventh, and twenty-first metal plates 201 while anodic coupling preferably occurs at the sixth and sixteenth metal plates 201. For another example, in a preferable embodiment of the reactor 1000 wherein the core 200 comprises seventeen metal plates 201, the cathodic coupling preferably occurs at the first, ninth, and seventeenth plates 201, while anodic coupling preferably occurs at the fourth and thirteenth plates 201. It should be noted that the core may comprise additional or fewer metal plates than stated in either example (e.g., 13 plates (cathode: first, seventh, and thirteenth; anode: fourth and tenth), 9 plates (cathode: first, fifth, and ninth; anode: third and seventh), and 5 plates (cathode: first, third, fifth; anode: second and fourth)). The minimum amount of plates required is two: an anodic and cathodic plate.

Referring again to FIG. 1, the electrolyte inlet 400 preferably comprises: at least one tube 401; and a coupling means 402. The coupling means preferably couples the tube 401 to a plurality of ducts 203 in a fluid and gas tight manner, all of said coupled ducts 203 suitably extending from a single side of the core 200. Operably, an electrolyte may pass from the tube 401 into the core 200 via the inlet ducts 203.

Figure 4:
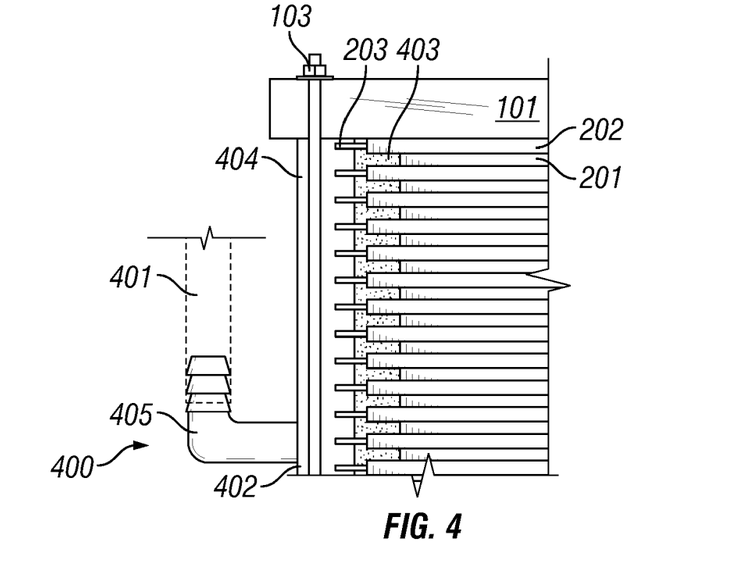
FIG. 4 is another section of the cross-section of FIG. 2B.

FIG. 4 depicts a cross section of the electrolyte inlet 400 and depicts a preferable embodiment of the coupling means 402. As seen in the figure, a preferable coupling means 402 comprises: sealant 403 (e.g., RTV silicone or the equivalent); a dome 404; and a barb by male thread elbow 405. Suitably, the dome 404 is adapted for placement over the plurality of ducts 203 to be coupled to the tube 401. In a preferable embodiment, the dome is bored acrylic glass, other type of methyl methacrylate plastic, or the like. The elbow 405 is adapted to thread into the dome 404 and interference fit into the tube 401. All core 200 surfaces under the dome 404 and all interfaces are preferably provided with the sealant 403 whereby the core 200, dome 404, and elbow 405 provide a fluid and gas sealed channel, and whereby fluid and gas therein remains out of contact with any metal plate 201 edges exposed at the side of the core 200. In operation, the dome and associated components are pressed against the core 200 via interaction with the casing 100. In the preferable embodiment depicted in the figures, the dome 404 is pressed against the core and screwed to the casing 100 to retain the position and pressure.

Figure 3:
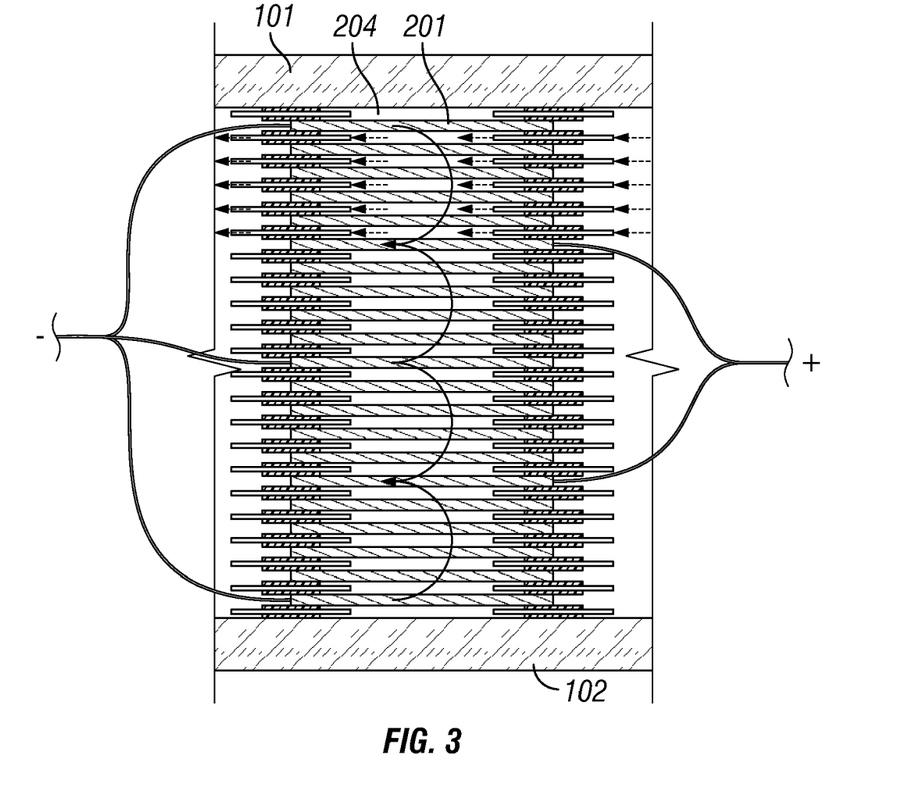
FIG. 3 is a section of the cross-section of FIG. 2B.

Referring again to FIG. 1, the gas and effluent outlet 500 preferably comprises: at least one tube 501; and a coupling means 502. The coupling means is preferably the same as the coupling means associated with the inlet 400. Furthermore, the modes and methods of coupling are preferably similar. Accordingly, FIG. 3 illustrates equally the outlet 500 and inlet 400.

Figure 5:
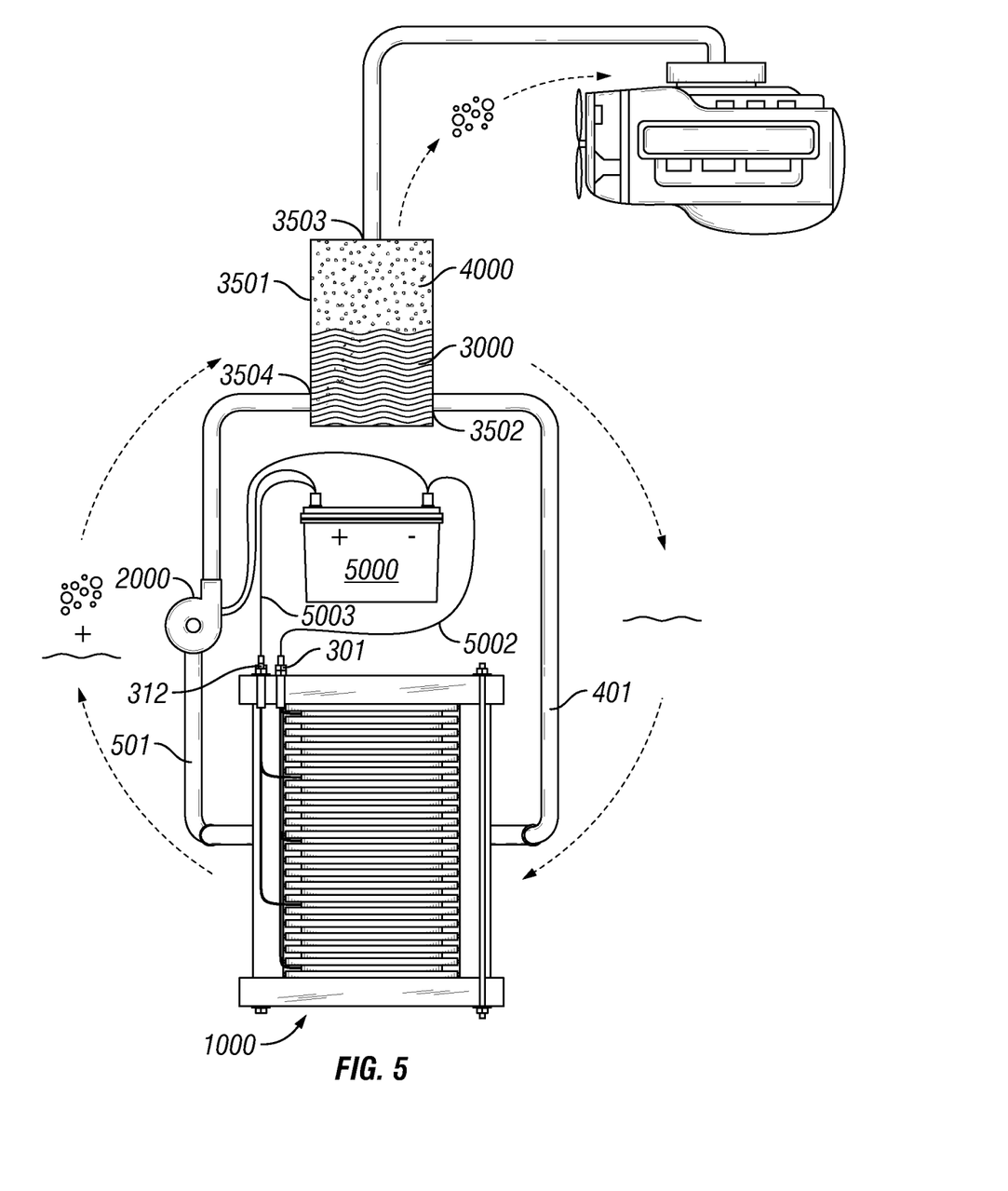
FIG. 5 is an overview of the system for supplementing the air-intake of an internal combustion engine using the electrolytic reactor of FIG. 1.

FIG. 5 illustrates an electrolytic system for the production and collection of hydrogen gas. As seen in the figure, the system comprises the reactor 1000, a pump 2000, an electrolyte reservoir 3000, a gas chamber 4000, and an electricity source 5000. As discussed further below, pump 2000 drives the circulation of fluids and gases through the system, the reservoir 3000 provides electrolyte to the reactor 1000, the gas chamber 4000 collects gasses produced in the reactor 1000, and the electricity source 5000 provides electric current to the reactor 1000 and the pump 2000. In the preferable embodiment, all components of the subject system may be provided to an automobile under the hood thereof.

Still referring to FIG. 5, the reservoir 3000 and gas chamber 4000 preferably compose a single receptacle 3501, the electrolyte reservoir 3000 defining the lowermost portion of the receptacle 3501, the gas chamber 4000 occupying the highest portion. Receptacle 3501 preferably features: (1) an electrolyte outlet 3502; (2) a gas outlet 3503; and, (3) a gas and electrolyte inlet 3504.

Still referring to FIG. 5, the primary function of the reservoir 3000 is suitably to administer input electrolyte to, and collect output effluent from, the reactor 1000. Relatedly, the primary function of the gas chamber 4000 is to collect output gases from the reactor 1000 and administer the collected gas to the air-intake of a combustion engine, as discussed below. Operably, the receptacle 3501: stores surplus gas and electrolyte; provides electrolyte to the reactor 1000 via the electrolyte outlet 3502 coupled to the tube 401; receives output gasses and electrolyte via the gas and electrolyte inlet 3504 coupled to tube 501; provides output gasses to the air intake of an internal combustion engine via the gas outlet 3503.

Further referring to FIG. 5, the electricity source 5000 preferably comprises a battery 5001, anodic wiring 5002, and cathodic wiring 5003. The primary function of the electricity source is to provide electricity to the pump 2000 and the reactor 1000. Operably, the electricity source 5000 suitably provides electricity to the reactor 1000 via conductively connecting the battery 5001 to the anodic and cathodic terminals 301, 302 of the reactor 1000 via the anodic and cathodic wiring 5002, 5003 respectively. Connecting the battery 5001 to the pump 2000 will be readily apparent to one with ordinary skill in the art (the pump 2000 is preferably of the type commonly installed for cooling computers comprising a fluid cooled heat exchanger).

Still referring to FIG. 5, the reactor 1000 is preferably configured as set forth above. The primary function of the reactor 1000 is to electrolytically convert an electrolyte into its component gases. As mentioned above in connection with FIG. 2B, an electrolyte is provided to the core 200 from the reservoir 3000 via the tube 401 coupled to a plurality of ducts 203. An appropriate electrolyte is preferably water or water plus KOH.

Referring now to FIG. 3, with the battery 5001 connected to the terminals 301, 302 as seen in FIG. 5, electricity suitably flows from anodic to cathodic metal plates 201. The flow of electricity preferably fluxes from plate 201 to plate 201 through the electrolyte occupying the pockets 204 therebetween. Under the flow of electricity, the electrolyte decomposes into its component gases (e.g., $2H_2O(l) \rightarrow 2H_2(g)+O_2(g)$; $E_0 = -1.229$ V). Preferably, any remaining electrolyte and resultant gases flow out of the core 201 toward the receptacle 3501 via a plurality of ducts 203 coupled to the tube 501.

It should be noted that at all times, the electrolyte only contacts the metal plates 201 while within the pockets 204. In other words, the electrolyte preferably only contacts the planar surface 201 circumscribed by the spacer 202 of the metal plates 201 and not the edges visible at the outside of the core. Confining the electrolyte to the planar surface 201 reduces the amount of electricity lost through the edges and thus increases the efficiency of the reactor 1000. Additionally, to increase the amount of planar surface 201 area on a metal plate 201 that electrolytically contacts an electrolyte, the planar surface 201 may preferably be sanded, or otherwise textured, to create a rough surface. A greater surface area in contact with the electrolyte electrolytically produces more resultant gas. Etching or otherwise grooving the surface will also facilitate this objective.

Preferably, electricity is provided to the reactor 1000 at low amperage, preferably and approximately at 2 amps. The low amperage results in a fractional amount of the electrolyte within the reactor being electrolytically decomposed to gases. The fractional decomposition of the electrolyte is preferable because, as discussed below, residual electrolyte within the reactor draws heat from the reactor 1000 via forced convection. Furthermore, the fractional decomposition of the electrolyte is preferable because, as discussed below, the electrolyte does not require frequent replenishment thereby reducing the maintenance of the system. In a preferable embodiment, the car battery associated with operation of the internal combustion engine may provide the electricity, and an electric circuit for reducing the amperage to the stated level may be provided between the battery and the reactor 1000. Such an electric circuit should be known to those skilled in the pertinent art.

It should be noted that in an alternate embodiment the system may feature voltage control whereby the amps may be adjusted between 2 and 10 or 15 amps.

Referring again to FIG. 5, the pump 2000 is preferably coupled to the outlet tube 501. In another preferable embodiment, the pump 2000 may be coupled to the inlet tube 401. The pump 2000 may preferably be a 12 volt CPU pump for circulating cooling fluid throughout a computer. These pumps are well known to those skilled in the art.

The primary function of the pump 2000 is to push/induce electrolyte flow through the system. Referring to FIGS. 3 and 5, a pump 2000 preferably attached to the effluent and gas outlet tube 501 pumps gas and effluent from the reactor into the reservoir 3000. As the effluent leaves the reactor 2000, electrolyte from the reservoir 3000 is drawn into the reactor 1000. Accordingly, the pump 2000 cycles electrolyte from the reservoir 3000, to the reactor 1000, and back to the reservoir 3000. Suitably, the gases accompanying the electrolyte effluent in the gas outlet tube 501 bubbles up through the reservoir 3000 and into the gas chamber 4000.

Referring once again to FIG. 3, cycling the electrolyte through the system via the pump 2000 has the preferable consequence of forced convection heat transfer from the metal plates to the cycling electrolyte. As electricity flows from metal plate 201 to metal plate 201, inherent resistance to the electricity flow produces heat. Increased heat reduces efficiency and may cause the electrolyte to burn off, especially when operated in ambient conditions of high temperature. Accordingly, the driven electrolyte circulation preferably renders the reactor 1000 into a heat exchanger whereby the efficiency is increased. Furthermore, the heat exchange and efficiency added to the reactor results in less maintenance on the system as mentioned above.

In an alternate embodiment, gravity may substitute for the pump 2000, but this design is less preferable for heat exchanging purposes.

Still referring to FIG. 3, it should be noted, that anodic and cathodic plates 201 are preferably spaced by ordinary metal plates 201 to provide additional surface area for electrolytic reaction and to provide additional heat exchange channels. However, placing too many metal plates 201 in between the anodic and cathodic metal plates 201 may be detrimental to the reactor 1000 since excessive electrical resistance produced thereby may render the reactor inoperable.

Accordingly, FIGS. 1 through 5 illustrate a preferable method for producing hydrogen gas. First, an electrolyte is provided to the reservoir 3000 and allowed naturally flow into the system whereby a pump 2000 is primed thereby. A preferable electrolyte is water or water plus potash (KOH). Initiating the pump preferably circulates the water through the system (from the reservoir 3000, to the reactor 1000, to the reservoir 3000 . . . ). Initiating the reactor 1000 produces an electricity flux between the metal plates 201 that electrolytically decomposes a fraction of the water into hydrogen and oxygen gases ($2H_2O(l) \rightarrow 2H_2(g)+O_2(g)$; $E_0 = -1.229$ V) as the water passes through the reactor pockets 204. Still driven by the pump 2000, the resultant gases and residual water continue through the reactor 1000 into the reservoir 3000, wherein the gasses bubble up into the gas chamber. As mentioned above, the circulation of water into the pockets 204 and residual water out of the pockets preferably exchanges heat between the water and the reactor.

Any hydrogen gas produced by the electrolytic system should preferably be delivered to the air-intake of an internal combustion engine. In a preferable embodiment, a hole is punctured into the air filter composing the air-intake. To provide the air-intake with hydrogen, a tube is preferably coupled to the gas outlet 3503 of the receptacle 3501 and strung through the punctured hole and down the troddle to the MAP sensor. Ultimately, the hydrogen is combined with the fuel-air mixture prior to combustion. It is contemplated that the presently disclosed system could be provided during the production of an automobile or retrofitted as an aftermarket accessory/supplement to an old automobile.

A preferable mode of installation is securing the reactor to the chassis of the automobile wherein the reactor 1000 inlet 400 is vertically superior to the reactor core, and wherein the reactor 1000 outlet 500 is vertically inferior. Such a configuration makes installation easier and provides easier access to the inlet 400 and outlet 500. It is also contemplated that multiple reactors 1000 may be installed into a single automobile.

It should be noted that FIGS. 1 through 5 and the associated descriptions are of illustrative importance only. In other words, the depictions and descriptions of the present invention should not be construed as limiting of the subject matter in this application. The apparatuses, assemblies, components, order and inclusion of steps, and methods discussed hereby are susceptible to modification without changing the overall concept of the disclosed invention. Such modifications might become apparent to one skilled in the art after reading this disclosure.

I claim:

1. An electrolytic reactor comprising:
    a core defined by a plurality of whole metal plates separated by peripheral gaskets, said plurality of metal plates composed of at least one anodic metal plate and at least one cathodic metal plate;
    an inlet through one of said peripheral gaskets for providing an electrolyte to a pocket defined between a top surface of one of said metal plates, a bottom surface of another one of said plates, and said one of said peripheral gaskets;
    an outlet through said one of said peripheral gaskets for gas and the electrolyte to leave said pocket; and,
    a pump that (a) forces the electrolyte through the inlet into the pocket and (b) forces gas and a remainder of the electrolyte through the outlet.

2. The reactor of claim 1 further comprising an electric current provided (a) between said anodic and cathodic plates at approximately 2 amperes and (b) through the electrolyte in said pocket.

3. The reactor of claim 1 wherein said one and said another one of said whole metal plates respectively feature rough top and bottom surfaces.

4. The reactor of claim 1 wherein said outlet is in fluid communication with an air-intake of an internal combustion engine.

5. The reactor of claim 1 wherein said one and said another one of said plurality of whole metal plates is disposed between said cathodic and anodic metal plates.

6. The reactor of claim 1 wherein water is provided to the reactor as the electrolyte.

7. The reactor of claim 1 further comprising:
    Wherein said inlet and outlet define cooperating ducts through said pocket; and,
    a sealant around the ducts whereby the electrolyte does not contact said one and said another one of said plurality of metal plates unless said electrolyte is within said pocket.

8. The reactor of claim 1 wherein said one and said another one of said metal plates are disposed between anodic and cathodic metal plates.

9. An automobile comprising:
    an internal combustion engine with an air-intake;
    an electrolyte reservoir;
    a gas reservoir in fluid communication with said air-intake;
    an electrolytic reactor comprising
        a core with at least one pocket defined between a bottom surface of a first metal plate, a top surface of a second metal plate, and a peripheral gasket between said first and metal plates
        an amount of electrolyte from said electrolyte reservoir disposed in said at least one pocket, said amount of electrolyte only in contact with one of said top surface, said bottom surface, or said gasket,
        an electric current passing through the pocket from the bottom surface to the top surface so that a portion of said amount of electrolyte is converted to an amount of gas,
        an inlet to the pocket that is in fluid communication with the electrolyte reservoir, said inlet for providing said amount of electrolyte to the pocket,
        an outlet from the pocket that is in fluid communication with the electrolyte reservoir and the gas reservoir, said outlet for providing said amount of gas to the gas reservoir and for providing said amount of electrolyte, less said portion of electrolyte, to the electrolyte reservoir; and,
    a pump that delivers (a) said amount of electrolyte to the pocket via the inlet, (b) said amount of gas to the gas reservoir, and (c) said amount of electrolyte, less said portion of electrolyte, to the electrolyte reservoir.

10. The automobile of claim 9 wherein said electric current is low amperage.

11. The automobile of claim 9 wherein said top and bottom surfaces are rough surfaces.

12. The automobile of claim 9 wherein said amount of gas is directed to said air-intake from said gas reservoir.

13. The automobile of claim 9 wherein said electric current is generated by at least three cathodes and two anodes.

14. The automobile of claim 9 featuring a schedule for providing fresh electrolyte to the electrolyte reservoir that is similar in timing to a schedule for changing the oil of said internal combustion engine.

15. The automobile of claim 9 wherein said inlet and said outlet define cooperating ducts through said gaskets.

16. The automobile of claim 9 wherein water plus KOH is provided to the reactor as the amount of electrolyte.

17. A method of charging an internal combustion engine comprising the steps of:
    forcefully passing an electrolyte between first and second whole metal plates separated by a peripheral gasket so that (a) the only portion of the first metal plate that is contacted by the electrolyte is a top surface thereof and (b) the only portion of the second metal plate that is contacted by the electrolyte is a bottom surface thereof;
    passing an electric current from the first whole metal plate to said second whole metal plate, said electric current passing through said electrolyte;
    directing any resultant hydrogen to an air-intake of said internal combustion engine.

18. The method of claim 17 wherein said top and bottom surfaces are rough surfaces.

19. The method of claim 17 wherein the steps are simultaneously accomplished at differing locations within an electrolytic reactor.

20. The method of claim 17 wherein said electrolyte is water or water plus KOH.

21. A heat-exchanger comprising:
    a plurality of pockets, said pockets each defined by a top surface of a whole metal plate, a bottom surface of another whole metal plate, and a peripheral gasket disposed between said whole metal plates;
    cooperating ducts through each of said peripheral gaskets;
    a means for generating heat in said metal plates via passing electricity through said pockets;
    an electrolyte heat transfer medium; and, a means for forcing said electrolyte through said pocket via said cooperating ducts, wherein the only components of said whole metal plates that are contacted by the electrolyte are said top and bottom surfaces.

22. A core of an electrolytic reactor comprising:
a plurality of pockets, said pockets each defined by a top surface of a whole metal plate, a bottom surface of another whole metal plate, and a peripheral gasket disposed between said whole metal plates;
wherein at least one of said pocket is connected to an anode at one of said component plates; and,
wherein at least one of said pockets is connected to a cathode at one of said component plates.

23. An electrolytic pocket comprising:
two whole metal plates separated by a peripheral gasket between a top surface of one of said two whole metal plates and a bottom surface of the other of said two hole metal plates, wherein a pocket is defined, said pocket consisting of (1) the top surface of one of said two whole metal plates, (2) the bottom surface of the other of said two whole metal plates, and (3) the peripheral gasket; and,
cooperating ducts through said peripheral gasket.

* * * * *